United States Patent
Baba (10) Patent No.: US 7,276,312 B2
(45) Date of Patent: Oct. 2, 2007

(54) LIGHT-DETECTABLE SOLID THIN-FILM SECONDARY BATTERY

(75) Inventor: Mamoru Baba, Morioka (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 0 days.

(21) Appl. No.: 10/542,205

(22) PCT Filed: Dec. 26, 2003

(86) PCT No.: PCT/JP03/17079

§ 371 (c)(1),
(2), (4) Date: Jan. 9, 2006

(87) PCT Pub. No.: WO2004/064189

PCT Pub. Date: Jul. 29, 2004

(65) Prior Publication Data

US 2006/0159986 A1 Jul. 20, 2006

(30) Foreign Application Priority Data

Jan. 14, 2003 (JP) ............................. 2003-006379

(51) Int. Cl.
- *H01M 6/36* (2006.01)
- *H01M 6/38* (2006.01)
- *H01L 31/00* (2006.01)

(52) U.S. Cl. ...................................... 429/117; 136/261
(58) Field of Classification Search ................ 429/117; 136/261

See application file for complete search history.

(56) References Cited

U.S. PATENT DOCUMENTS 6,906,436 B2 * 6/2005 Jenson et al. ................ 307/116

FOREIGN PATENT DOCUMENTS

| JP | 4-356977 | 12/1992 |
| JP | 5-37000 | 2/1993 |
| JP | 2002-237294 | 8/2002 |
| WO | WO 01/29912 | 4/2001 |

* cited by examiner

*Primary Examiner*—Gregg Cantelmo
*Assistant Examiner*—Eugenia Wang
(74) *Attorney, Agent, or Firm*—Westerman, Hattori, Daniels & Adrian, LLP.

(57) ABSTRACT

To provide novel devices constituting light detection systems with a simple configuration, a low maintenance cost, a reduced size and weight, and high reliability by integrating light detection components and power supplies.

A photosensitive solid-state thin-film lithium-ion secondary cell including a photosensitive negative-electrode active material layer as a component, wherein extraneous light can be constantly detected by utilizing a change in open-circuit voltage of the cell caused when the extraneous light is incident on the photosensitive negative-electrode active material layer. Lithium ions can be readily received and emitted and light in a broad wavelength range over a near-infrared light range, the entire visible light range, and a near-ultraviolet light range can be detected by utilizing a porous silicon layer having a controlled porosity as the negative-electrode active material layer.

6 Claims, 7 Drawing Sheets

LIGHT-DETECTABLE SOLID THIN-FILM SECONDARY BATTERY

TECHNICAL FIELD

The present invention relates to all-solid-state thin-film secondary cells having a photosensitive function and photodetectors loaded with the secondary cells.

BACKGROUND ART

In general, in order to detect light, for example detection of natural light or artificial light, detection of interruption of continuous incident light, and detection of frequency of pulsed light, light detection components and power supplies in addition to peripheral electronic circuits must be provided to light detection systems. In such cases, the light detection components and the power supplies are usually prepared as separated units. Porous silicon is known as a light-emitting element or a light-emitting and receiving element (for example, see Patent Document 1). A photodetector using direct-transition-type porous silicon is also known (for example, see Patent Document 2).

Patent Document 1: Japanese Unexamined Patent Application Publication No. 4-356977 (Japanese Patent No. 3306077)

Patent Document 2: Japanese Unexamined Patent Application Publication No. 5-37000 (Japanese Patent No. 3216153)

DISCLOSURE OF THE INVENTION

Problems to be Solved by the Invention

It is an object of the present invention to provide novel devices for constituting light detection systems with a simple configuration, a low maintenance cost, a reduced size and weight, and high reliability by integrating light detection components and power supplies.

Means for Solving the Problem

In order to solve the above-mentioned problems, the inventors have developed a solid-state thin-film secondary cell having a novel configuration combining a photosensitive function with a negative-electrode active material layer for the solid-state thin-film secondary cell.

Namely, the present invention is as follows:
(1) A photosensitive solid-state thin-film lithium-ion secondary cell including a photosensitive negative-electrode active material layer as a component, wherein extraneous light can be constantly detected by utilizing a change in open-circuit voltage of the cell caused when the extraneous light is incident on the photosensitive negative-electrode active material layer.
(2) The photosensitive solid-state thin-film secondary cell according to aspect (1), wherein lithium ions are readily received and emitted and light in a broad wavelength range over a near-infrared light range, the entire visible light range, and a near-ultraviolet light range is detected by utilizing a porous silicon layer having a controlled porosity as the negative-electrode active material layer.
(3) The photosensitive solid-state thin-film secondary cell according to aspect (1) or (2), wherein a composite composed of a solid electrolyte layer, a positive-electrode active material layer, and a current collector layer is disposed on the porous silicon layer on a surface of a substrate.
(4) The photosensitive solid-state thin-film secondary cell according to any one of aspects (1) to (3), wherein each of the positive-electrode active material layer and the current collector layer has a film composition and thickness such that the overall transmittance of visible light in the range of 400 nm to 800 nm exceeds 1% on average.
(5) The photosensitive solid-state thin-film secondary cell according to aspect (3), wherein the porous silicon layer at the surface of the substrate is formed by anodizing a surface of a silicon wafer substrate.
(6) The photosensitive solid-state thin-film secondary cell according to any one of aspects (1) to (5), wherein a light detection sensitivity is improved by increasing incidence efficiency of light from the positive-electrode side by forming the positive-electrode active material layer disposed as an upper layer in a stripe pattern or in a mesh pattern.
(7) A monolithic photodetector loaded with the secondary cell prepared by integrating electronic circuits and the solid-state thin-film secondary cell according to any one of aspects (1) to (6) on a single silicon substrate.

Conventional photoconductive cells and photodiodes detect current flows caused by incident light or voltages caused by the current flows in both sides of external resistors, namely, they are a current type or an energy-consumption type.

On the other hand, the photosensitive solid-state thin-film secondary cell of the present invention detects a change in voltage between positive-electrode and negative-electrode terminals of the cell caused by electrons and positive holes induced to the negative electrode (porous silicon). Basically, incident light does not cause current at all. This is because ion current produced by shuttling lithium ions between the positive-electrode and the negative-electrode terminals flows in the cell, and electronic current penetrating between the positive-electrode and the negative electrode cannot flow in the cell. From this point of view, the photosensitive solid-state thin-film secondary cell of the present invention is a voltage type or an energy-nonconsumption type. No discharge caused by continuous irradiation of light occurs in the cell. Only self-discharge slowly proceeds. This is the same as in unused cells during storage.

If a decrease in the terminal voltage (an increase in electric potential of the negative electrode) by light-irradiation is caused by the same reason as that in usual discharge, it means that a part of $Li^+$ ions in porous silicon active material of the negative electrode return to a $LiMn_2O_4$ side of the positive-electrode active material. However, experimental results are that the potential returns to the original level by stopping the light-irradiation. This shows that a decrease in the terminal voltage (an increase in electric potential of the negative-electrode) by light-irradiation is not caused by migration of $Li^+$ ions. It is assumed that the electrons and positive holes generated in pairs by light-irradiation contribute to a temporary increase in the negative-electrode potential. The pairs of electron and positive-hole cannot be generated by irradiation of visible light in normal silicon crystals, it can be generated only in porous silicon.

The photosensitive solid-state thin-film secondary cell of the present invention is suitable for driving electronic devices in a controlling manner. For example, the number of items or heads is counted by detecting an increase in voltage in both terminals of the cell, the increase is generated by interruption of natural light (sunlight) during the daytime or interior light during the night by something; and security during the night is managed by detecting an increase in voltage generated by interruption of artificial light in an invisible near-infrared range from a light-emitting diode or a laser diode.

Power supply to electronic devices is generally performed by sending signals through electronic circuits (wired, therefore, contact circuits). In such a system, when radio transmission (light rays, therefore, noncontact manner) is required for some reason (for example, a need for electrical noise-free signal transmission), a component for receiving the light signals is necessary. The photosensitive solid-state thin-film secondary cell can constitute a component having its own cell for driving the component itself.

Furthermore, a power supply (cell) unit which can control discharging electricity in a cell by temporarily decreasing the terminal voltage of the cell to lower than a threshold level with external light signals to stop the electrical supply to a load from the cell temporarily or for a predetermined period of time, or a photosensitive controller which has an own electricity-supplying function can be achieved.

Discharge caused by light irradiation does not occur in the photosensitive solid-state thin-film secondary cell of the present invention. Light-detecting modes are categorized to a direct-current mode (steady light mode) and an alternate-current mode (on-off mode). In the direct-current mode, the surface of the secondary cell is constantly irradiated with visible light or near-infrared light (invisible light). When the light path is interrupted by something, the interruption is detected as an increase in voltage generated in the terminals of the cell. For example, this can be applied to a component of a security system. A change in luminance from night to daytime can be detected as a decrease in voltage generated in the terminals of the cell, thus, daybreak is recognized and electrical devices are switched on (or off). For example, this can be applied for driving unmanned electronic devices in the daytime or the night only. In the alternate-current mode, the number of items or heads interrupting light is counted (increasing-voltage type) with a time resolution in the order of milliseconds, or light-flashing frequency is counted (decreasing-voltage type).

Light detection using the photosensitive solid-state thin-film secondary cell of the present invention is performed via an open-circuit condition of the secondary cell or a sufficiently large resistance. Therefore, the light detection can be performed under a condition substantially the same as that of a secondary cell in storage or unused (self-discharging condition) and cell capacity is rarely drained (basically, drain by self-discharge only).

BEST MODE FOR CARRYING OUT THE INVENTION

Figure 1:
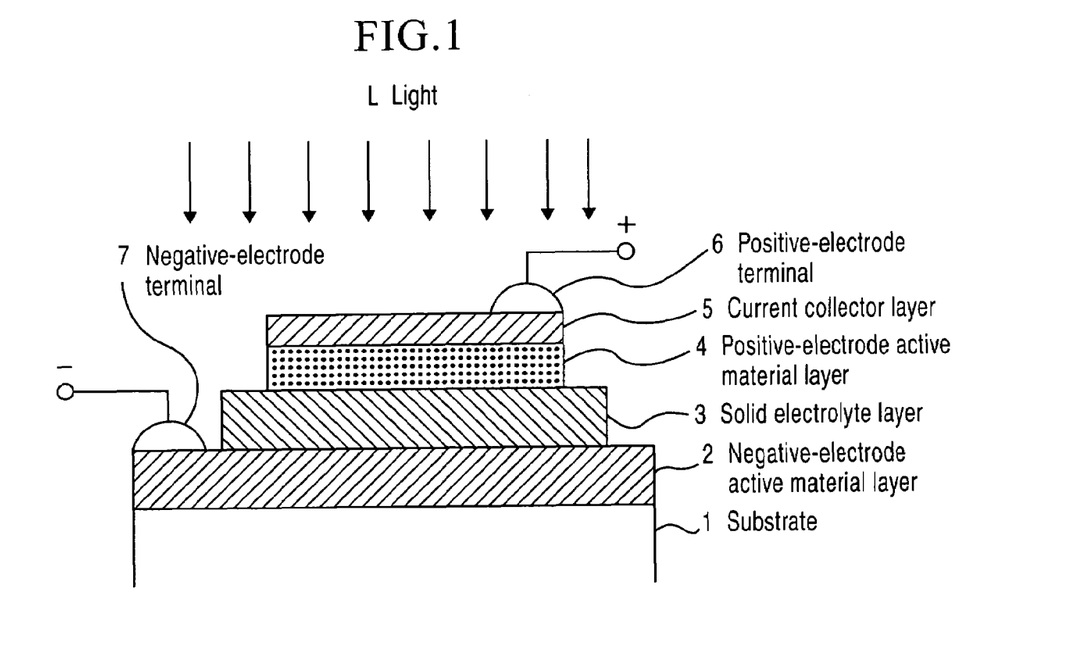
FIG. 1 is a schematic diagram illustrating a photosensitive solid-state thin-film secondary cell according to an embodiment of the present invention.
Figure 2:
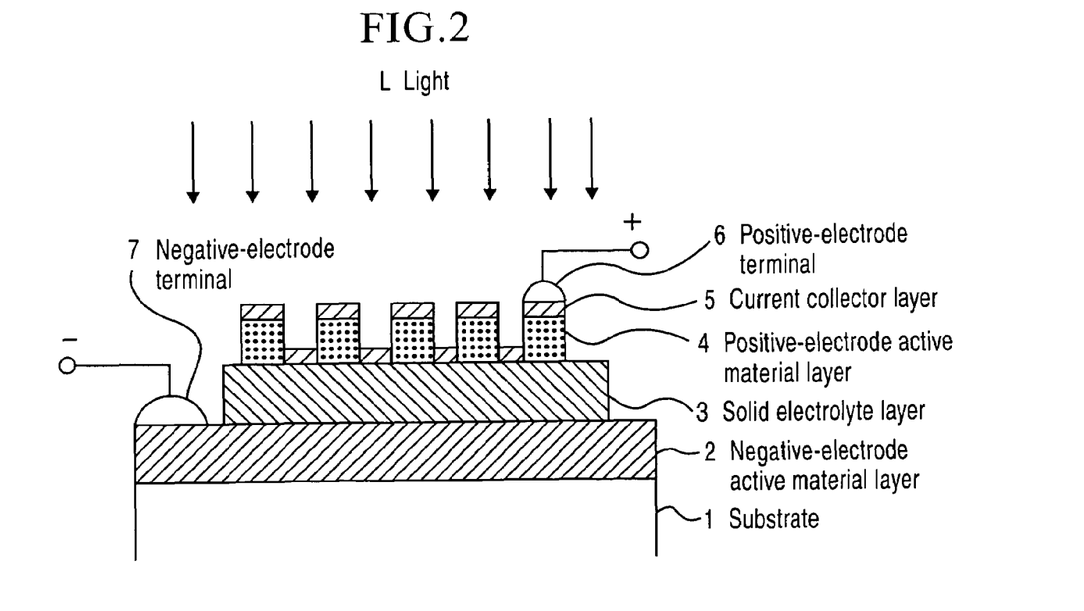
FIG. 2 is a schematic diagram illustrating a photosensitive solid-state thin-film secondary cell according to another embodiment of the present invention.

FIGS. 1 and 2 are schematic views of photosensitive solid-state thin-film secondary cells according to embodiments of the present invention. A basic configuration of the cells includes a substrate 1, a negative-electrode active material layer 2, a solid electrolyte layer 3, a positive-electrode active material layer 4, and a current collector layer 5 in this order. A positive-electrode terminal 6 is disposed on the current collector layer 5, and a negative-electrode terminal 7 is disposed on the negative-electrode active material layer 2. The terminals 6 and 7 are connected to a circuit or a device for monitoring (detecting) voltage abnormality (voltage rise or fall) between the terminals of the cell.

The structures of the solid electrolyte layer 3, the positive-electrode active material layer 4, and the current collector layer 5 are the same as those of common solid-state thin-film lithium-ion secondary cell, but the negative-electrode active material layer 2 is made of a material having light sensitivity.

Porous silicon can be used as such an active material. Porous silicon has peculiar silicon crystals including a skeleton structure produced by a anodizing process and a remaining crystalline portion having a thickness (skeleton thickness) of about several nanometers to ten and several nanometers.

Silicon crystals have a band-gap energy of 1.1 eV because of their energy-band structure, so they are sensitive to only light having a wavelength longer than about 1.1 µm. In such a case, since the optical transition is indirect, the optical transition efficiency is disadvantageously low. However, a reduction in size of the silicon microcrystals to the above-mentioned size enhances a band-gap energy by a quantum size effect and also changes the indirect transition into direct transition. As a result, the silicon crystals are dramatically changed to be effectively sensitive to visible light having a short wavelength. These properties of porous silicon are known.

A substrate is formed by laminating polycrystalline silicon on a glass substrate coated with a transparent conductive film, and then the surface of the polycrystalline silicon is treated for anodization. A substrate of a silicon monocrystal may be treated for anodization. By the anodization, most of the crystalline silicon is melted away to make a large number of cylindrical holes in the direction perpendicular to the crystal surface. As a result, a skeleton structure having a lot of holes is formed and the monocrystalline structure is maintained in a remaining crystalline portion. In a large-boned structure (a low porosity), sensitivity to near-infrared light and visible light having a long wavelength, such as red light and light close to red, is observed. In a small-boned structure (a high porosity), sensitivity to ultraviolet light and visible light having a short wavelength, such as blue light and light close to blue, is observed. Namely, light detection over a broad wavelength range including a near-infrared light range, the entire visible light range, and an ultraviolet light range is possible by controlling the porosity by conditions for the anodization.

In the negative-electrode active material layer 2 made of a porous silicon layer having a controlled porosity, a structural microporous layer effectively functions as a receiving layer for receiving lithium ions, and an efficient performance of a secondary cell is achieved by the ease in receiving and emitting of lithium ions. Furthermore, light detection in a broad wavelength range from near-infrared light to visible light can be achieved.

When a silicon wafer is used as a substrate and a skeleton structure of porous silicon is formed on a surface of the substrate by anodizing, the anode formation is performed so that the skeleton structure is formed by digging downward from the original crystal surface. The resulting structure in this manner is different from that of the porous silicon layer disposed on the crystal face of a silicon wafer.

Basically, in the secondary cell according to the present invention, all of the current collector (which includes a transparent conductive film), the positive-electrode material, and the solid electrolyte (a transparent film is used in this embodiment) are transparent. However, semitransparent materials are not useless for the detection; for example, in a thin film having a transmissivity of 50%, a light detection sensitivity is merely decreased to a half.

When the positive-electrode active material layer considerably absorbs visible light, as shown in FIG. 2, incidence efficiency of light from the positive-electrode side can be increased by forming the positive-electrode active material layer 4 disposed as an upper layer in a stripe pattern (linear pattern) or in a mesh pattern (grid pattern); thus, the light detection sensitivity can be improved. A film, such as a $Li_3PO_{4-x}N_x$ film, used as the solid electrolyte layer 3 is usually transparent over the entire visible light range.

With such a structure described above, extraneous light L shown by arrows in FIGS. 1 and 2 enters in the negative-electrode active material layer 2 with a photosensitive function, resulting in a change in the open-circuit voltage of the cell; thus, extraneous light can be constantly detected.

A monolithic photodetector loaded with the secondary cell, which is mountable on a single semiconductor substrate as in an LSI by integrating necessary peripheral electronic circuits on the single silicon substrate with the solid-state thin-film secondary cell, can be readily achieved.

EXAMPLES

Example 1

A negative-electrode active material layer made of porous silicon was formed by anodizing a silicon substrate under the following conditions. A Si substrate: (100) crystal face and a resistivity of 4 to 7 Ω·cm, a chemical solution: a mixture of 40 wt % hydrofluoric acid: 99.5 wt % ethanol=1:1, an anodizing current density: 5 mA/cm², anodizing time: 1 min, anodizing temperature and environment: 0° C. in the dark, and a film thickness of porous silicon: 0.23 μm.

A solid electrolyte layer, a positive-electrode active material layer, and a current collector layer were formed under the following conditions. The solid electrolyte layer ($Li_3PO_{4-x}N_x$) having a film thickness of 1 μm: RF sputtering at 100 W for 20 hours, the positive-electrode active material layer ($LiMn_2O_4$) having a film thickness of 0.8 μm: RF sputtering at 100 W for 8 hours, and the current collector layer (vanadium metal) having a film thickness of 0.1 μm: DC sputtering at 0.6 A for 15 minutes. A light detection property of the resulting secondary cell was examined. Terminal voltage in measuring charge and discharge was measured by a source meter (KEITHLEY 2400), spectral response was measured by a digital multimeter (KEITHLEY DMM 196), and time response of light was measured by an oscilloscope (KIKUSUI 7202A).

Figure 3:
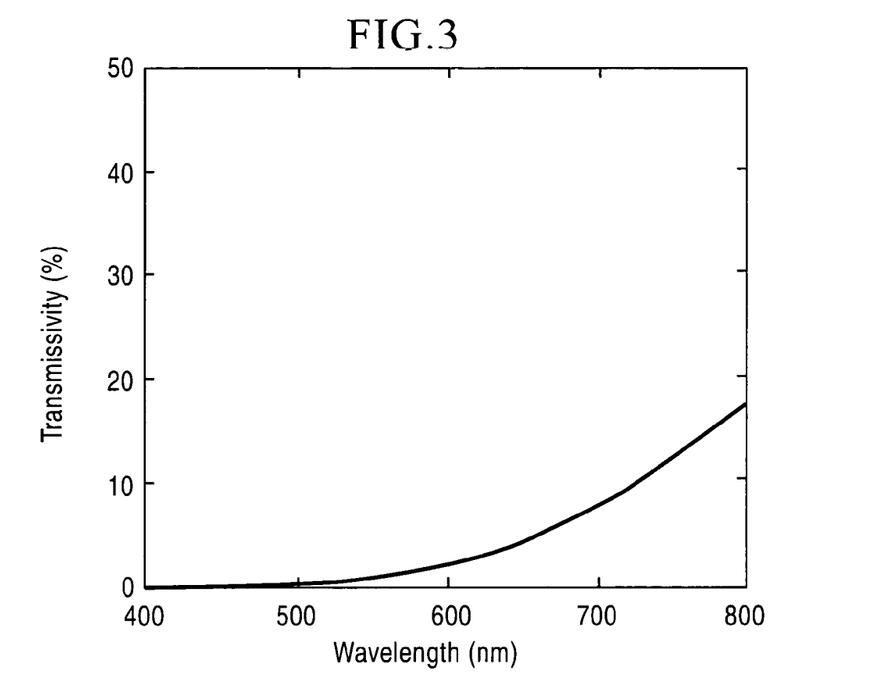
FIG. 3 is a graph showing a transmissivity characteristic of a $LiMn_2O_4$ positive-electrode active material film.

FIG. 3 is a graph showing a transmissivity characteristic of a positive-electrode active material $LiMn_2O_4$ film used in this embodiment.

Figure 4:
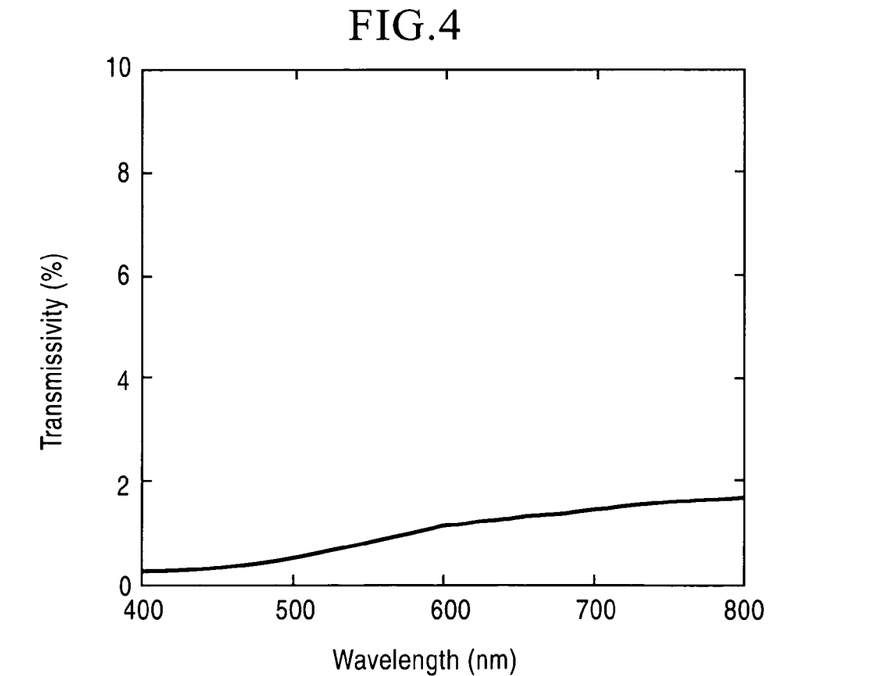
FIG. 4 is a graph showing a transmissivity characteristic of a current collector V film.

FIG. 4 is a graph showing a transmissivity characteristic of a current collector V film used in this embodiment.

Figure 5A:
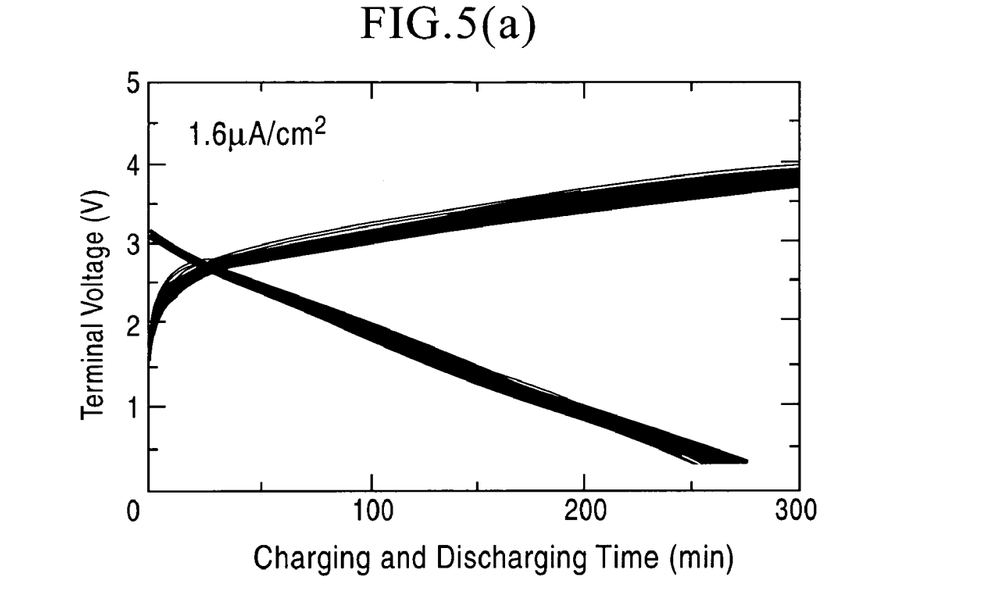
FIG. 5(a) is a graph showing charge and discharge characteristics of a solid-state thin-film lithium-ion secondary cell according to a first embodiment in the dark.

FIG. 5(a) is a graph showing charge and discharge characteristics of this solid-state thin-film lithium-ion secondary cell in the dark. The charge and discharge curves are the results when the charge and discharge were repeated about 50 cycles. A high terminal voltage of about 3 volts was observed at the start of discharge and a discharging capacity was about 7 μAh/cm²; thus, the secondary cell showed a relatively good performance. This proves that the porous silicon layer functioned as a negative-electrode active material of the secondary cell with a normal and good property.

Figure 5B:
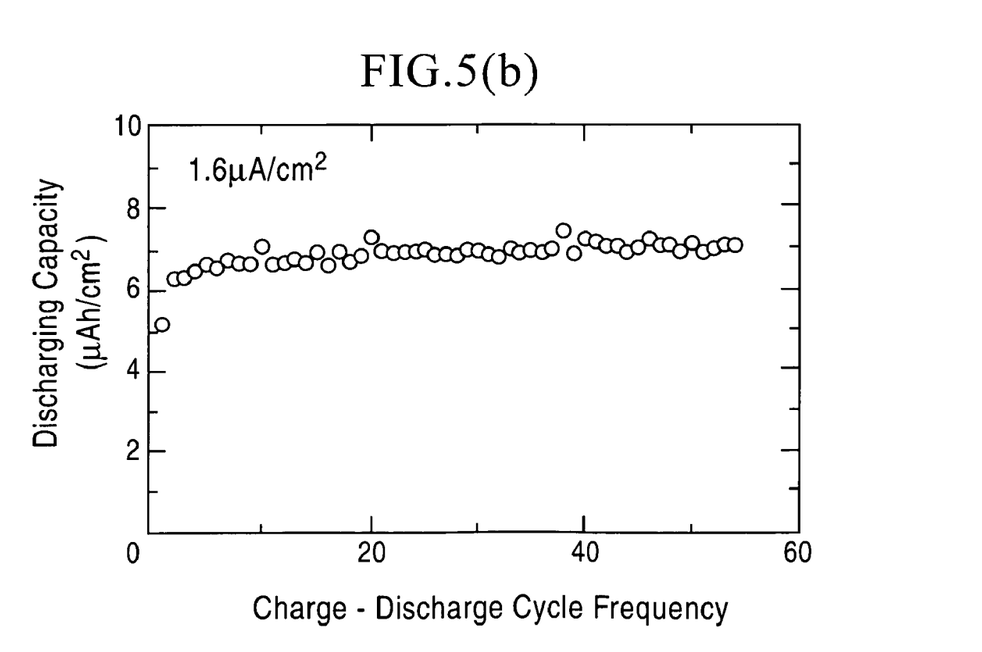
FIG. 5(b) is a graph showing discharging capacity of the solid-state thin-film lithium-ion secondary cell according to the first embodiment in repeated charge and discharge cycles.

FIG. 5(b) shows discharging capacity plotted against the number of repeated cycles. The capacity was increased in the beginning when the charge and discharge cycles were repeated about 50 cycles, but then the capacity was maintained substantially constant. In the range shown in the graph, no decrease was observed. This also proves that the solid-state thin-film secondary cell using the porous silicon layer as the negative-electrode active material was excellent in repeatability and reliability.

Figure 6:
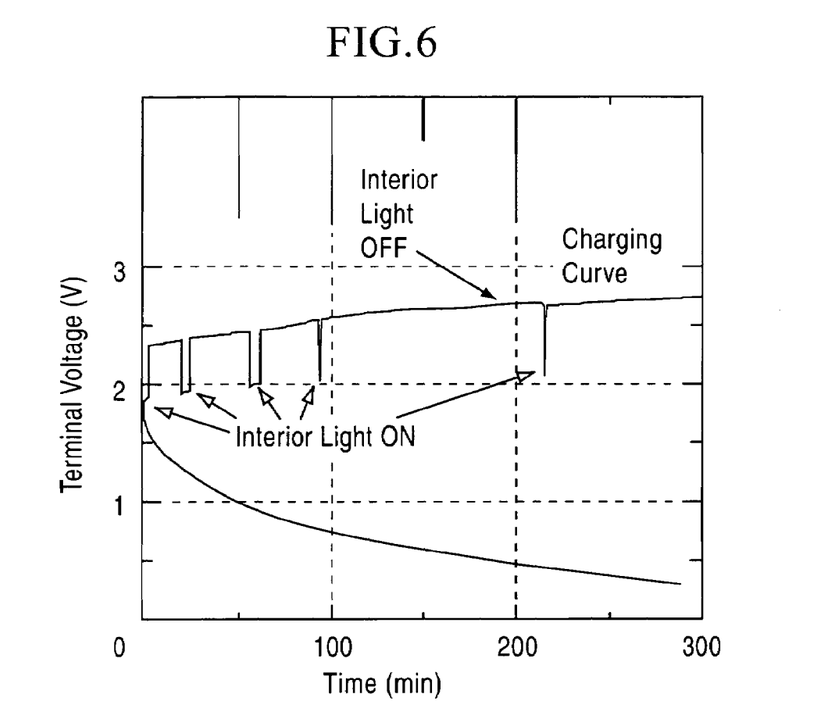
FIG. 6 is a graph showing terminal voltage response characteristics by switching on and off an interior light during the measurement of charging characteristics of the solid-state thin-film lithium-ion secondary cell according to the first embodiment in the dark.

FIG. 6 is a graph showing terminal voltage response characteristics by switching on and off an interior light (overhead fluorescent light) during the measurement of charging characteristics in the dark. The result directly shows that the open-circuit voltage of the secondary cell of this embodiment responded to on/off of the interior light.

Figure 7:
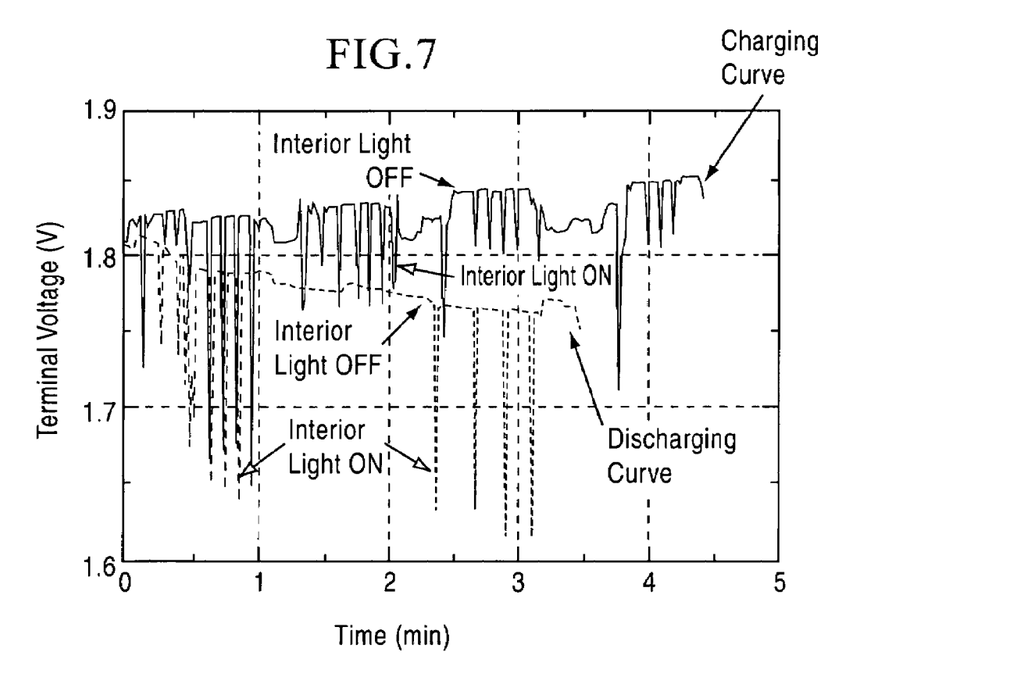
FIG. 7 is a partially enlarged view of FIG. 6.

FIG. 7 is a partially enlarged view of FIG. 6. As shown in FIG. 7, decreases in the terminal voltage were observed when the secondary cell of this embodiment placed in a camera obscura was irradiated with light from the interior light (overhead fluorescent light) by repeatedly opening a window of the camera obscura for 1 second during charge and discharge cycles. The secondary cell exhibited a significantly rapid response to light. This is one of the highly important characteristics of the secondary cell according to the present invention.

Figure 8:
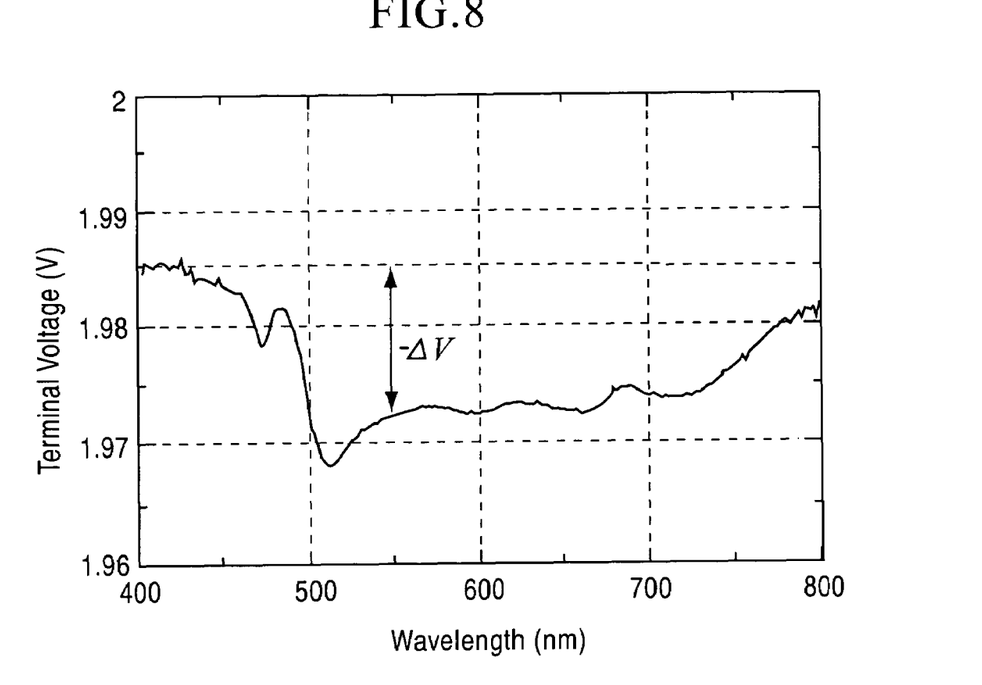
FIG. 8 is a graph showing a wavelength spectrum in light sensitivity of the solid-state thin-film lithium-ion secondary cell according to the first embodiment.

FIG. 8 is a graph showing a wavelength spectrum of light sensitivity indicated by −ΔV in the terminal voltage of the secondary cell according to this embodiment. The result shows that the secondary cell of the present invention had light sensitivity in the entire visible light range (400 to 800 nm). The light sensitivity range can be broadened to a range including near-infrared and near-ultraviolet by modifying conditions for preparing porous silicon.

Figure 9:
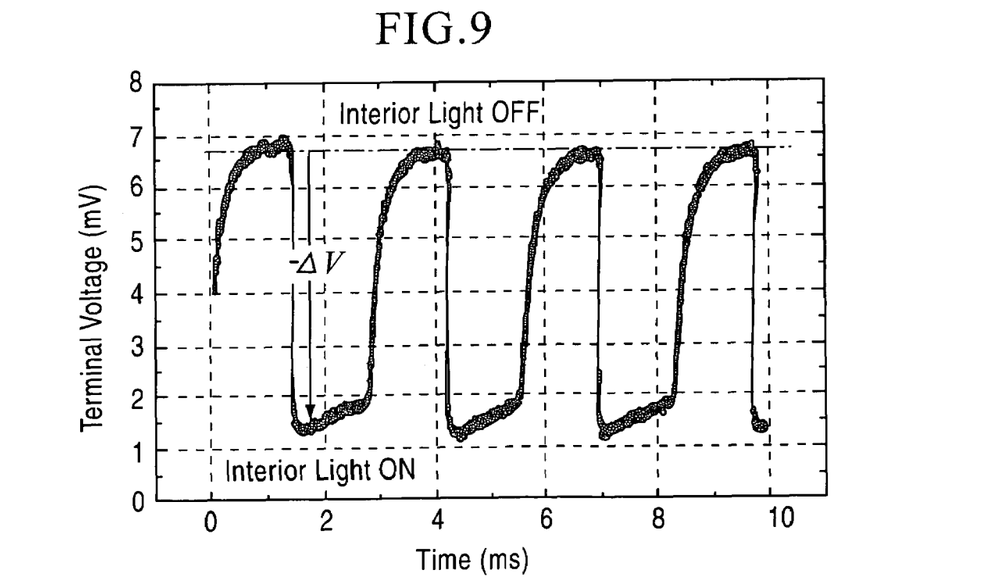
FIG. 9 is a graph showing time-response waveforms of the terminal voltage of the solid-state thin-film lithium-ion secondary cell according to the first embodiment.

FIG. 9 is a graph showing time-response waveforms of light sensitivity indicated by −ΔV in the terminal voltage of the secondary cell according to this embodiment. The fall of voltage when light was intercepted by a light chopper (so-called alternating light) was extremely rapid. It seemed to approximately correspond with the waveforms of light. On the other hand, when the light was off, rise of voltage (recovery) slightly delayed. However, the results show that the secondary cell of this embodiment can respond to an alternating light signal frequency of about 1 kHz.

Figure 10:
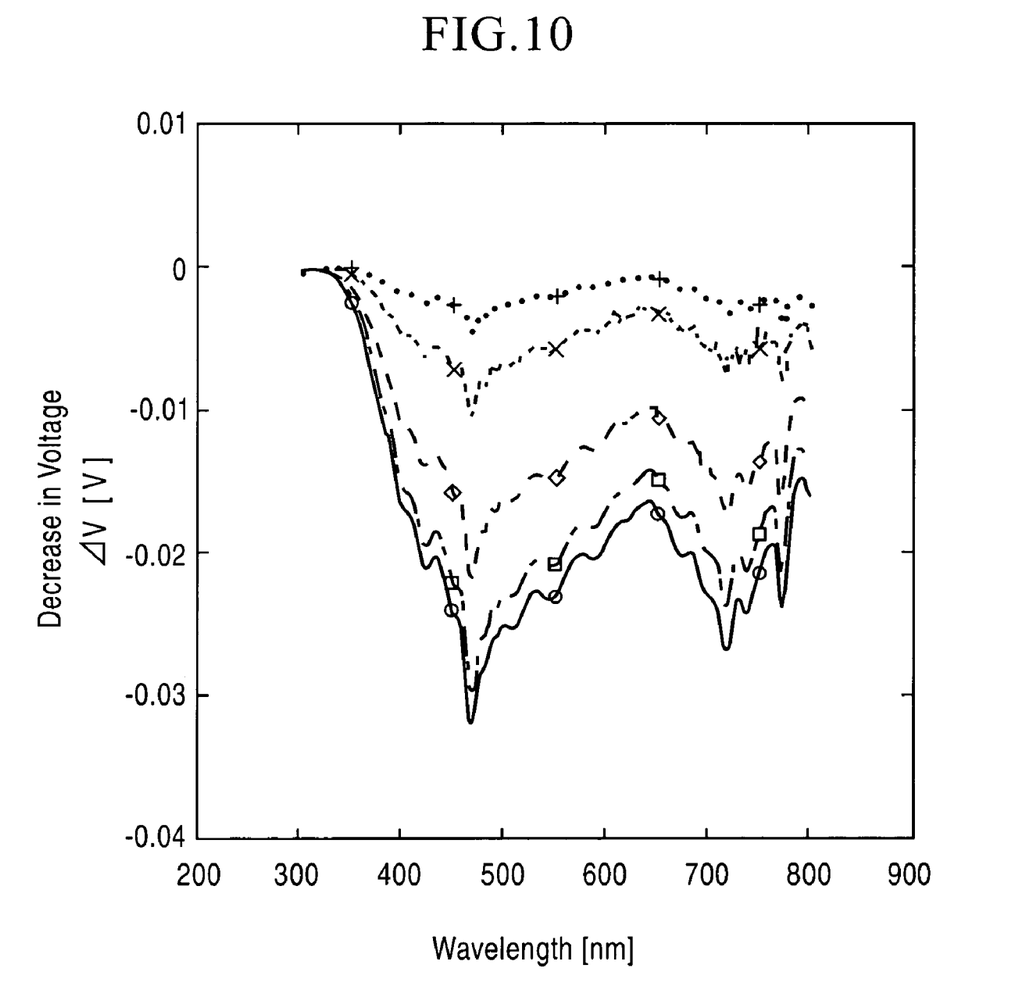
FIG. 10 is a graph showing decreasing spectra of terminal voltage depending on light intensity in the solid-state thin-film secondary cell.

FIG. 10 is a graph showing decreasing spectra of terminal voltage depending on Light intensity in the secondary cell of this embodiment. The light intensity (%) was adjusted by a distance of slits of a filter.

Figure 11:
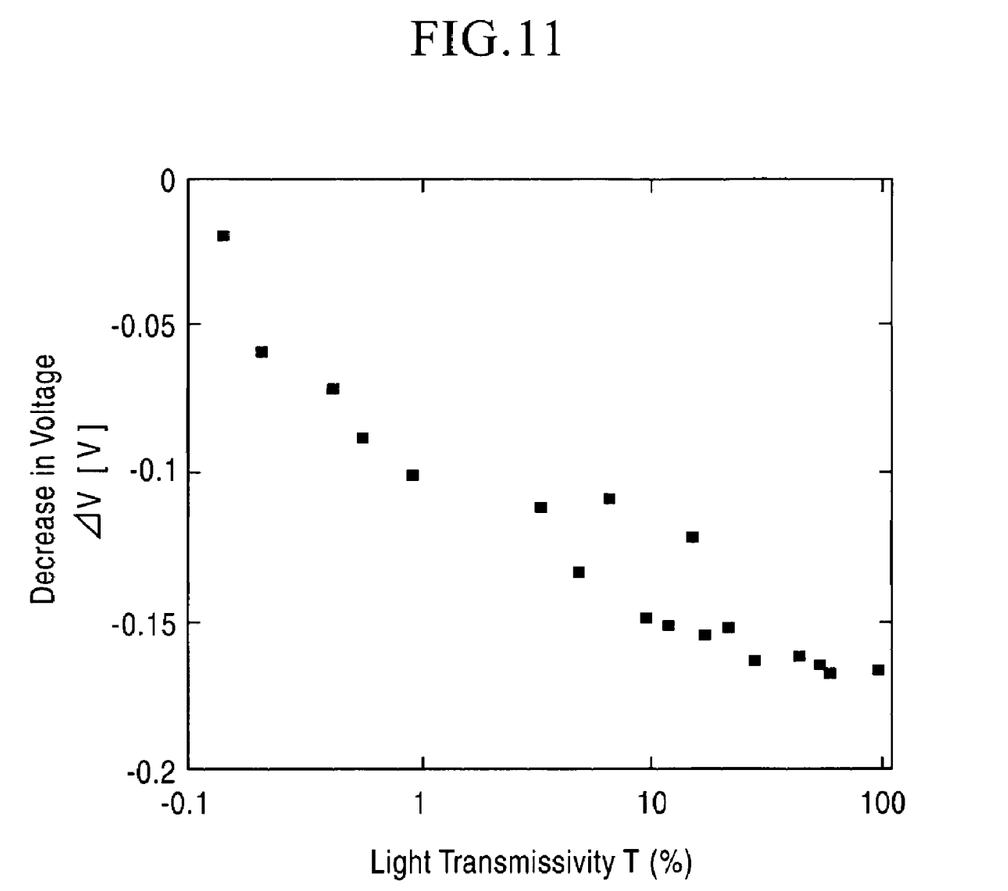
FIG. 11 is a graph showing decreases of terminal voltage depending on light intensity in the solid-state thin-film secondary cell.

FIG. 11 is a graph showing decreases of terminal voltage depending on light intensity in the secondary cell of this embodiment. The light intensity (%) was adjusted by a distance of slits of a filter.

INDUSTRIAL APPLICABILITY

In a photodetector disclosed in Patent Document 1 referred to as a conventional technology, a pn junction is structurally indispensable. Since the function of such a photodetector is light detection only, a power supply (or battery) is necessary to drive the photodetector. Compared to this, a photosensitive solid-state thin-film secondary cell according to the present invention uses a single p-type (or n-type) Si negative-electrode active material alone. Since the negative-electrode active material also has a function for detecting light, the light detection system with a simple configuration, a low manufacturing cost, and a reduced size and weight can be provided. By the application of this, extraneous light-controlled power supplies and photosensitive components or devices including a novel configuration, for example, a controller with a photosensitive function for controlling discharged electricity in a cell caused by extraneous light and a photosensitive component or controlling device able to supply electricity by utilizing a change in terminal voltage, can be achieved.

The invention claimed is:

1. A photosensitive solid-state thin-film lithium-ion secondary cell comprising:
   a substrate;
   a photosensitive negative-electrode active material layer comprising porous silicon formed on said substrate by anodizing;
   a solid electrolyte layer formed on said photosensitive negative-electrode active material;
   a positive-electrode active material layer formed on said solid electrolyte layer; and
   a current collector layer formed on said positive-electrode active material layer,
   wherein the photosensitive solid-state thin-film lithium-ion secondary cell is structured so as to make said photosensitive negative-electrode active material layer receive extraneous light,
   wherein extraneous light is to be constantly detected by utilizing a change in open-circuit voltage of the cell caused when the extraneous light is incident on the photosensitive negative-electrode active material layer.

2. The photosensitive solid-state thin-film secondary cell according to claim 1, wherein lithium ions are readily received and emitted and light in a broad wavelength range over a near-infrared light range, the entire visible light range, and a near-ultraviolet light range is detected by utilizing a porous silicon layer having a controlled porosity as the negative-electrode active material layer.

3. The photosensitive solid-state thin-film secondary cell according to claim 1, wherein each of the positive-electrode active material layer and the current collector layer has a film composition and thickness such that the overall transmittance of visible light in the range of 400 nm to 800 nm exceeds 1% on average.

4. The photosensitive solid-state thin-film secondary cell according to claim 1, wherein the photosensitive negative-electrode active material layer comprising the porous silicon is formed by anodizing to dig downward a surface of a silicon wafer substrate.

5. The photosensitive solid-state thin-film secondary cell according to claim 1, wherein a light detection sensitivity is improved by increasing incidence efficiency of light from the positive-electrode side by forming the positive-electrode active material layer disposed as an upper layer in a stripe pattern or in a mesh pattern.

6. The photosensitive solid-state thin-film secondary cell according to claim 1, wherein the photosensitive solid-state thin-film secondary cell is formed together with a electronic circuit of a photodetector on a single silicon substrate.

* * * * *